US011260641B2

(12) United States Patent
Razon et al.

(10) Patent No.: US 11,260,641 B2
(45) Date of Patent: Mar. 1, 2022

(54) APPARATUS FOR RETICULATION OF ADHESIVE AND METHODS OF USE THEREOF

(71) Applicant: AMERICAN HONDA MOTOR CO., INC., Torrance, CA (US)

(72) Inventors: Kevin C. Razon, Greensboro, NC (US); Andrew Y. Wong, Greensboro, NC (US); Nicholas F. Martin, High Point, NC (US); Jason H. Thomas, Greensboro, NC (US)

(73) Assignee: AMERICAN HONDA MOTOR CO., INC., Torrance, CA (US)

( * ) Notice: Subject to any disclaimer, the term of this patent is extended or adjusted under 35 U.S.C. 154(b) by 103 days.

(21) Appl. No.: 16/409,428

(22) Filed: May 10, 2019

(65) Prior Publication Data

US 2020/0353737 A1 Nov. 12, 2020

(51) Int. Cl.
*B32B 37/00* (2006.01)
*B32B 38/00* (2006.01)
(Continued)

(52) U.S. Cl.
CPC .......... *B32B 37/0076* (2013.01); *B32B 37/04* (2013.01); *B32B 37/06* (2013.01);
(Continued)

(58) Field of Classification Search
CPC ..... B32B 37/0076; B32B 37/04; B32B 37/06; B32B 37/146; B32B 38/0036;
(Continued)

(56) References Cited

U.S. PATENT DOCUMENTS

| 4,155,800 A | * | 5/1979 | Wilson | B29C 65/52 |
| | | | | 156/497 |
| 4,249,974 A | | 2/1981 | Wilson | |

(Continued)

FOREIGN PATENT DOCUMENTS

| GB | 2096535 A | 10/1982 |
| GB | 2486120 A | 6/2012 |

OTHER PUBLICATIONS

Mohammadreza Azimi et al., "Using Acoustic Liner for Fan Noise Reduction in Modern Turbofan Engines", International Journal of Aeronautical and Space Sciences, 15(1), (2014), pp. 97-101.

*Primary Examiner* — George R Koch
(74) *Attorney, Agent, or Firm* — Arent Fox LLP

(57) ABSTRACT

A method, apparatus, and system for reticulating an adhesive on a workpiece. The workpiece may be perforated with a plurality of passages that extend through a first side to a second side. To reticulate an adhesive on the first side of a workpiece, a flow of heated fluid is provided through a nozzle. The nozzle provides the fluid at a first pressure to a first group of the perforations. Once the temperature at the first side of the workpiece reaches a specified range, the fluid pressure may be increased or otherwise set in order to clear the perforations by forcing the adhesive out of or away from each of the perforations. Temperature of the adhesive, pressure within the nozzle, and/or light passage through the perforations may be monitored for logical control or quality assurance.

21 Claims, 11 Drawing Sheets

(51) Int. Cl.
  *B32B 38/18* (2006.01)
  *B32B 37/04* (2006.01)
  *B32B 37/06* (2006.01)
  *B32B 41/00* (2006.01)
  *G10K 11/168* (2006.01)
  *B32B 38/04* (2006.01)
  *B32B 37/10* (2006.01)
  *B32B 37/12* (2006.01)
  *F02K 1/82* (2006.01)

(52) U.S. Cl.
  CPC ...... *B32B 38/0036* (2013.01); *B32B 38/1833* (2013.01); *B32B 41/00* (2013.01); *B32B 2037/0092* (2013.01); *B32B 2037/1072* (2013.01); *B32B 2037/1223* (2013.01); *B32B 2038/047* (2013.01); *F02K 1/827* (2013.01); *G10K 11/168* (2013.01)

(58) Field of Classification Search
  CPC ............... B32B 38/1833; B32B 41/00; B32B 2037/0092; B32B 2037/1072; B32B 2037/1223; F02K 1/827; G10K 11/168; B29C 65/52; B29C 65/7838; B29C 66/4326; B29C 66/9121; B29C 66/9131
  See application file for complete search history.

(56) References Cited

U.S. PATENT DOCUMENTS

| | | | |
|---|---|---|---|
| 4,291,080 A | 9/1981 | Ely et al. | |
| 4,990,201 A | 2/1991 | Trnka | |
| 5,592,813 A | 1/1997 | Webb | |
| 5,721,402 A | 2/1998 | Parente | |
| 5,975,237 A | 11/1999 | Welch et al. | |
| 6,206,136 B1 | 3/2001 | Swindlehurst et al. | |
| 6,360,844 B2 | 3/2002 | Hogeboom et al. | |
| 6,439,340 B1 | 8/2002 | Shirvan | |
| 6,536,556 B2 | 3/2003 | Porte et al. | |
| 6,598,384 B1 | 7/2003 | Adkins | |
| 6,772,856 B2 | 8/2004 | Ishii | |
| 6,811,372 B1 | 11/2004 | Emborg et al. | |
| 6,859,974 B2 | 3/2005 | Haruch et al. | |
| 6,896,099 B2 | 5/2005 | Porte et al. | |
| 6,920,958 B2 | 7/2005 | Harrison | |
| 7,047,725 B2 | 5/2006 | Moe et al. | |
| 7,124,856 B2 | 10/2006 | Kempton et al. | |
| 7,331,182 B2 | 2/2008 | Graf et al. | |
| 7,401,682 B2 | 7/2008 | Proscia et al. | |
| 7,467,687 B2 | 12/2008 | Mitchell et al. | |
| 7,503,425 B2 | 3/2009 | Strunk | |
| 7,607,287 B2 | 10/2009 | Reba et al. | |
| 7,631,483 B2 | 12/2009 | Mani et al. | |
| 7,735,600 B2 | 6/2010 | Strunk et al. | |
| 7,784,283 B2 | 8/2010 | Yu et al. | |
| 7,797,809 B2 | 9/2010 | Costa et al. | |
| 7,798,285 B2 | 9/2010 | Chiou et al. | |
| 7,857,093 B2 | 12/2010 | Sternberger et al. | |
| 7,913,813 B1 | 3/2011 | Mathur | |
| 7,967,108 B2 | 6/2011 | Harper | |
| 8,245,815 B2 | 8/2012 | Valleroy et al. | |
| 8,469,141 B2 | 6/2013 | Wang et al. | |
| 8,602,156 B2 | 12/2013 | Ali et al. | |
| 8,650,853 B2 | 2/2014 | Porte et al. | |
| 8,726,665 B2 | 5/2014 | Moore et al. | |
| 8,820,088 B2 | 9/2014 | Gilson et al. | |
| 8,820,477 B1 | 9/2014 | Herrera et al. | |
| 8,863,893 B2 | 10/2014 | Sternberger et al. | |
| 8,863,894 B2 | 10/2014 | Kato et al. | |
| 8,915,329 B1 | 12/2014 | Hermiller et al. | |
| 8,931,252 B2 | 1/2015 | Richardson et al. | |
| 9,097,179 B2 | 8/2015 | Brooks et al. | |
| 9,127,452 B1 | 9/2015 | Winfield et al. | |
| 2004/0026034 A1* | 2/2004 | Colin | B29C 66/234 156/308.4 |
| 2004/0060652 A1* | 4/2004 | McNeely | B32B 37/1284 156/285 |
| 2006/0169532 A1 | 8/2006 | Patrick | |
| 2007/0295554 A1 | 12/2007 | Flucht et al. | |
| 2009/0014234 A1 | 1/2009 | Bagnall | |
| 2011/0151183 A1 | 6/2011 | Reller et al. | |
| 2012/0156006 A1 | 6/2012 | Murray et al. | |
| 2013/0000748 A1 | 1/2013 | Bouty et al. | |
| 2013/0306271 A1 | 11/2013 | Yu et al. | |
| 2014/0064928 A1 | 3/2014 | Todorovic et al. | |
| 2015/0060194 A1 | 3/2015 | Pongratz et al. | |
| 2015/0082794 A1 | 3/2015 | Schilp | |
| 2015/0252751 A1 | 9/2015 | Baltas | |
| 2015/0267593 A1 | 9/2015 | Lauder et al. | |
| 2015/0292413 A1 | 10/2015 | Soria et al. | |
| 2015/0369127 A1* | 12/2015 | Gilson | F02C 7/24 415/119 |
| 2018/0257196 A1* | 9/2018 | Simpson | B32B 5/024 |
| 2019/0003177 A1* | 1/2019 | Butler | B32B 5/024 |

* cited by examiner

APPARATUS FOR RETICULATION OF ADHESIVE AND METHODS OF USE THEREOF

FIELD OF THE INVENTION

Aspects of the present disclosure relate generally to an apparatuses and methods for applying adhesive over perforated panels, and specifically for applying adhesive during the manufacture of passive acoustic panels and/or liners useable for high-frequency attenuation in an aircraft engine.

BACKGROUND

Composite structures that utilize a cellular core are used for many purposes for structural and/or frequency attenuation purposes. Composite structures formed of metallic and/or composite materials are used in aircraft engines. These composite structures include a cellular core that is bonded to and sandwiched between an outer and an inner panel. When bonding a substrate comprised of the inner panel, cellular core, and outer panel, adhesives are used to bond the structure together and create a substrate that is essentially a cellular core sandwiched between the inner panel and outer panel. Once the structure is bonded, each cell of the cellular core forms an individual, at least substantially sealed, cavity defined by the outer panel, inner panel and the individual cell of the cellular core. This structure allows for a lightweight structure that has a number of structural advantages. Further, the inner and/or outer panel may include perforations that are in fluid communication with the individual cavities within the substrate. The perforations may have geometries and groupings that allow for specific resistive impedance value(s) that corresponding to specific acoustic duct modes and frequencies. The combination of the individual cavities and the perforations can function as Helmholtz resonators. Each individual cavity located within the substrate may be designed to have a geometry and/or volume that provides an acoustic reactance value that, along with the location, number of, and geometries of the perforations on the inner and/or outer panels, provide a total acoustic surface admittance value, optimized for mode shapes and frequencies of interest.

A number of methods have been used to apply adhesive to the inner and/or outer panels and/or the cellular core in the abovementioned substrate. One method of applying an adhesive to a cellular core includes brushing or rolling an adhesive onto the surface. However, using such a method makes it difficult to assure that the adhesive is uniformly applied to the surface. Another method involves applying a layer of film adhesive to the surface that is to be bonded. After the surfaces are mated, the structure is then cured at a temperature and duration required to form a permanent bond. However, when a perforated inner and/or outer panel is used, the aforementioned adhesive often blocks and/or clogs the perforations in the panel. The inventors recognized the need to displace and/or reposition an adhesive to prevent blockage of perforations in the inner and/or outer panel while providing an even distribution of adhesive in areas critical to the bonding of the substrate.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure, a system for reticulating an adhesive on at least a first side of a perforated panel, which may hereinafter interchangeably be referred to as a workpiece is disclosed. The system may include a temperature sensor for detecting a temperature of adhesive on the first side of the workpiece. The temperature sensor may be a non-contact temperature sensor. The system may further include a nozzle in communication with a fluid source for providing, a heated and pressurized fluid to the nozzle, and a positioning apparatus for positioning of the nozzle relative to the workpiece. The nozzle may include a chamber in fluid communication with the fluid source, an opening in fluid communication with the chamber, and a seal that is capable of selected sealable engagement of the nozzle with a corresponding selected portion of the workpiece.

In accordance with one aspect of the disclosure, a method for reticulating an adhesive on a surface of a workpiece is disclosed. The method may include: providing a flow of heated fluid, which may be air, via a nozzle. The fluid may be directed via the nozzle in a direction substantially perpendicular to and on a side opposite the surface of the workpiece to which the adhesive is applied. The workpiece may be perforated and/or include a plurality of passages extending from the surface of the workpiece to which the fluid is directed. It is noted that throughout the disclosure, the term perforations and passages may be used interchangeably. The nozzle may provide the fluid at a first flow rate so that a first normalized pressure is applied to a group of the plurality of passages. The temperature rise of the adhesive applied to the workpiece that results from the flow of heated fluid through the nozzle may be detected. Once the detected temperature falls within a specified range, the group of passages may be cleared by providing a second normalized pressure to each of the passages in the group, the pressure provided being greater than the first normalized pressure, so that the adhesive is forced through or away from each of the passages.

In accordance with another aspect of the disclosure, a non-transitory computer readable medium having instructions stored for operating a reticulation apparatus is disclosed. In accordance with aspects of the disclosure, when the instructions are executed by one or more processors, the reticulation apparatus is controlled to reticulate an adhesive on a first side of a workpiece. The reticulation apparatus may provide a flow of heated fluid, which may be air via a nozzle. At least one of the nozzle and a workpiece may be oriented such that fluid is directed via the nozzle in a direction substantially perpendicular to and on a side opposite the surface of the workpiece to which the adhesive is applied. The workpiece may be perforated and include a plurality of passages extending from the surface of the workpiece to which the fluid is directed. The nozzle may provide the fluid at a first flow rate so that a first normalized pressure is applied to a group of the plurality of passages. The temperature rise of the adhesive applied to the workpiece that results from the flow of heated fluid through the nozzle may be detected. Once the detected temperature falls within a specified range, the group of passages may be cleared by providing a second normalized pressure to each of the passages in the group, the pressure provided being greater than the first normalized pressure, so that the adhesive is forced through or away from each of the passages.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

Figure 1:
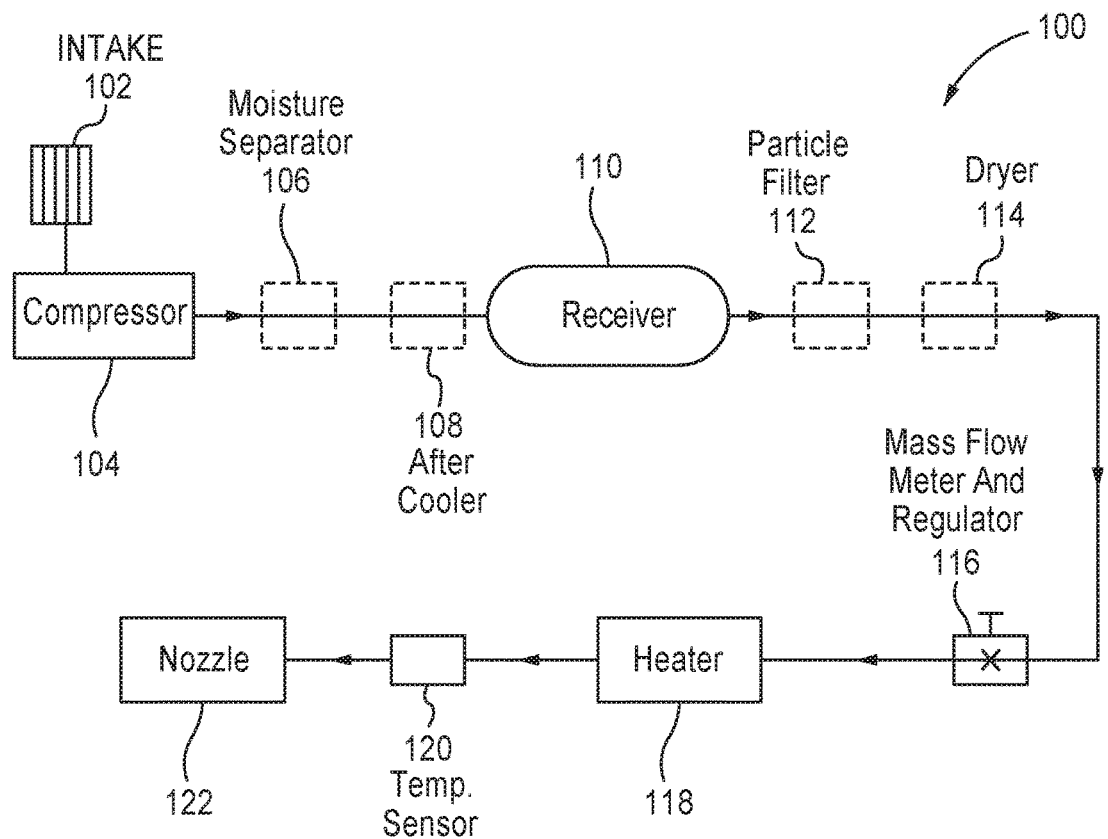
FIG. 1 is a representative diagram view of one example of the reticulation apparatus in accordance with an aspect of the disclosure.

The following includes definitions of selected terms employed herein. The definitions include various examples and/or forms of components that fall within the scope of a term and that may be used for implementation. The examples are not intended to be limiting.

The disclosure below relates reticulating an adhesive used in the formation of substrate. One example of the method and apparatus disclosed herewith includes the formation of composite, metallic and/or semi-metallic structures which utilize a cellular core which may serve structural and/or frequency attenuation purposes.

Illustrative aspects of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the apparatuses are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the apparatus described herein may be oriented in any desired direction.

Aspects of apparatuses and methods disclosed herein relate to the application of adhesive to a perforated workpiece, such as may be or comprise a portion of an aircraft component, and the execution of a reticulation process therefor, so as to clear the adhesive from the individual perforations in the panel such that the adhesive remains in portions of the workpiece between perforations. As an example, after a reticulation process is completed for a workpiece using one of the disclosed methods and/or apparatuses, a cellular core may be attached to the workpiece and the resulting assembled structure may be placed in an autoclave or oven at a requisite temperature and duration to heat the adhesive to a setting temperature so as to form a permanent bond. Once the outer workpiece, internal cellular core and inner workpiece are permanently bonded, the cellular core bonded to the inner and outer workpieces may together form multiple individual cells that may be in fluid communication with outside fluid via the individual perforations in the inner and/or outer panel(s).

The workpiece used in accordance with aspects of the present disclosure may be or include, an annular perforated panel. The perforated panel may have a plurality of holes, and the panel may have a low porosity (which may be within a range of 7-10%). As mentioned above, in order to bond the aforementioned cellular core to the workpiece, a layer of adhesive, which may be a film adhesive may first be applied to the surface of the workpiece that is to be bonded to the cellular core. If a thermoset adhesive is used, the adhesive may be or comprise an uncured adhesive that softens and flows when heat is applied to the adhesive. The adhesive may remain uncured until it is heated to a final curing temperature, and the curing temperature may be higher than the temperature required to soften the adhesive. Because the adhesive is applied as a single or several layers to a workpiece having perforations, if no reticulation process is applied, the adhesive may block the perforations in the workpiece after curing. Accordingly, the individual perforations may be cleared by reticulating the adhesive prior to permanent curing and bonding of the substrate, so that the individual perforations will remain open and free of obstructions when further assembly occurs.

One implementation of the reticulation method, system, and apparatus in accordance with aspects of the present disclosure allows for the efficient clearing of an adhesive from substantially all of the perforations in a workpiece. During the reticulation process, the adhesive is displaced and/or repositioned to prevent blockage of the perforations while providing an even distribution of adhesive in areas critical to the bonding of the substrate. Prior to the reticulation process, a layer of adhesive may be applied to a first side of the workpiece. The adhesive may then be reticulated by providing a pressurized and heated stream of fluid (which may be air) to a second side of the workpiece, the second side being opposite the first side of the workpiece. The pressurized and heated stream of fluid may be provided through a nozzle. During the initial stage of the reticulation process, the primary purpose of providing the heated fluid to the second side of the workpiece is to heat the workpiece so that the adhesive on the first side is softened.

During the heating of the workpiece and adhesive, the temperature of the adhesive may be monitored to ensure that the adhesive is at the correct temperature for reticulation. Monitoring of the temperature of the adhesive may ensure that the temperature of the adhesive is high enough to ensure that the adhesive is softened to a degree sufficient to ensure flowability of the adhesive, while also ensuring that the temperature of the adhesive does not meet or exceed the final curing temperature of the adhesive (which would otherwise prevent the adhesive's use for adhesion later in the assembly process) when thermoset adhesive is used. Once the temperature of the adhesive is at or above the softening temperature of the adhesive, the pressure of the fluid provided by the nozzle to the adhesive may be increased or otherwise set so as to clear the adhesive only from each of the perforations in the workpiece.

As discussed below, the pressure of the fluid provided to the workpiece may be increased by increasing the fluid mass flow provided to the nozzle. As also discussed in further detail below, the nozzle may include a seal around an exit port of the nozzle, and the pressure applied to the adhesive may also or alternatively be increased by creating a seal between the nozzle and the workpiece. By moving the nozzle from a position where the seal is spaced from the workpiece (e.g., which may occur during the heating step discussed above), to a position where the seal is in contact with the workpiece, the pressure of the fluid on the portion of the adhesive encompassed by the seal may be selectively increased by regulating the mass flow or inherently increased by formation of a seal between the nozzle and the workpiece. Once the mass flow is increased, the flow of the fluid in combination with the softening of the adhesive during the heating step may allow for the clearing of adhesive from the perforations in a portion of the workpiece.

Once the perforations in that portion of the workpiece are cleared, the process may be repeated for another group of perforations, and so on until the perforations throughout the entire workpiece are properly reticulated.

The proper reticulation of the adhesive may be verified through the use of a backlight on a second side of the workpiece. The backlight may be within the nozzle. If a backlight is provided at the second side of the workpiece, the amount of light passing through each perforation may increase once the perforations are open and cleared of adhesive. This verification process may be applied prior to a next set of perforations being reticulated. Based on the outcome of the verification process, any of the process parameters (e.g., pressure, temperature) may be altered to ensure that the perforations are properly cleared during the reticulation process. It should be understood that while the examples throughout mention circular perforations, the perforations in the panel may also be non-circular in shape, such as square, oblong, hexagonal, or the like. The perforations in the panel may also have a multitude of sizes.

FIG. 1 shows a high level representative diagram view of various components for an reticulation apparatus 100 for providing of a fluid (which may be pressurized air) to a nozzle 122 for reticulating an adhesive in accordance with aspects of the current disclosure. The system may include an intake 102 for receiving a fluid, such as air. A compressor 104 may compress the fluid and provide the compressed fluid to a receiver 110. One example of a receiver 110 is a single storage tank; however, it is noted that the receiver 110 may also include a plurality of storage tanks that may be interconnected and/or receive fluid from a separate compression source. The receiver 110 may also be in fluid communication with a mass flow meter and regulator 116 which may include a mass flow detector and a proportional control valve. The mass flow meter and regulator 116 may also include a meter for detection of a mass flow rate of the fluid. However, it is noted that the mass flow meter and regulator 116 may alternatively be separate from one another. The mass flow meter may automatically and/or manually be controlled by a controller. In the aforementioned example, the controller may receive inputs from a single or multiple mass flow meters that may form a closed loop control system for regulating the output of fluid from the mass flow meter and regulator 116.

The fluid provided may be conditioned to a controlled temperature and/or to remove moisture, particles, any lubricants, and/or contaminants that may originate from the compression process. Some examples of components to condition the fluid include a moisture separator 106, an aftercooler 108, a particle filter 112, and/or a dryer 114. It is noted that each of the abovementioned conditioning components are optional, and while the components are shown in a specific order along the flow of fluid in FIG. 1, the location within the system is not limited to as shown. Accordingly, each of the aforementioned conditioning components may be located at any suitable location or order along the fluid flow in the reticulation apparatus 100. Further, it is noted that any other suitable methods of and devices for conditioning fluid that are known in the art may be used in conjunction with or as a replacement for any of the abovementioned components.

The mass flow regulator and meter 116 may be in fluid communication with a heater 118 for heating the fluid. The heater 118 may be controlled so as to heat the fluid to a temperature within a requisite range necessary for softening the adhesive. If thermoset adhesive is used, the heater 118 may be controlled so as to heat the fluid so that the adhesive temperature achieves a temperature that is below the cure temperature of the adhesive. The heater 118 may be or include an electric heater. However, it is noted that the heater type is not limited to an electric heater and may be or include a fuel burning heater, and/or a heat exchanger. As also shown in FIG. 1, the reticulation apparatus 100 may further include a temperature sensor 120 located, downstream in the fluid flow relative to the heater 118, and the nozzle 122 may also be located downstream in the fluid flow relative to the heater 118. The temperature sensor 120 may include any well-known sensor in the art and may be or comprise a thermistor and/or a series of thermistors placed in contact with or proximity to the flow of fluid within the reticulation apparatus 100.

Figure 2:
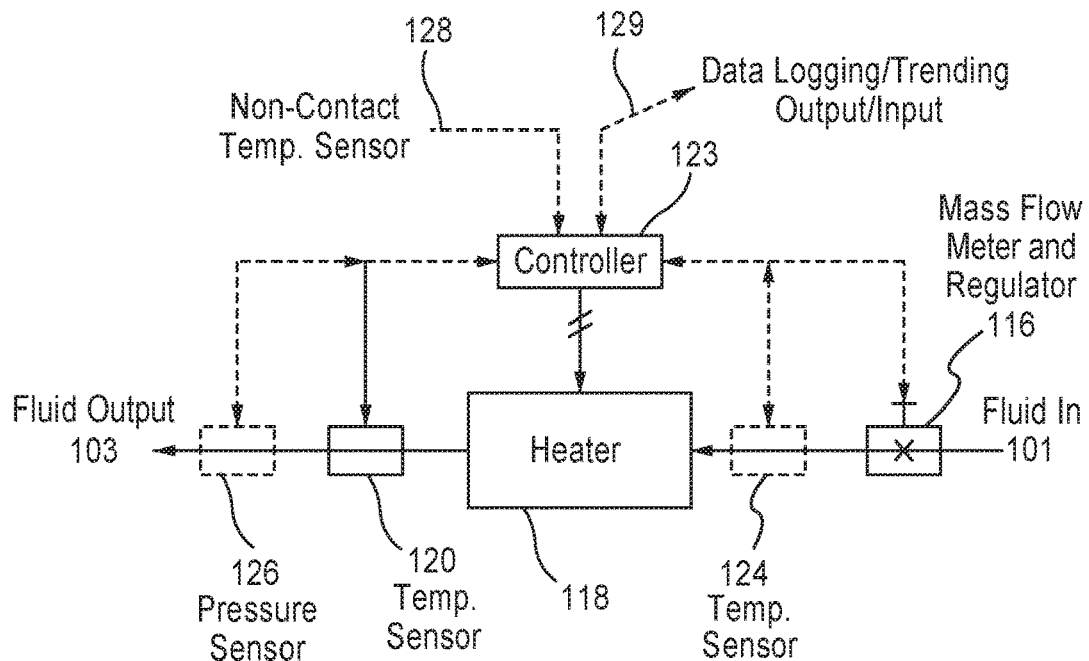
FIG. 2 is a representative diagram view of a heater and heater controller in accordance with an aspect of the disclosure.

The heater 118 of FIG. 1 may be a close-loop controlled heater as shown in and described in operation further with reference to the representative diagram of FIG. 2. As shown in FIG. 2, a controller 123 may control the output of the heater 118. The controller 123 may receive a signal from any one of or number of sensors including: a pressure sensor 126, a temperature sensor 120 located downstream of fluid flow relative to the heater 118 (as also shown in FIG. 1), a temperature sensor 124 located upstream of fluid flow relative to the heater 118, and/or the mass flow meter and regulator 116 (see also FIG. 1). The controller 123 may control output of the heater 118 based on an adjustable set-point in view of output of any one of or a combination the sensors listed above. Accordingly, the heat output of the heater 118 may remain substantially constant or may be periodically altered in a precise manner during the reticulation process, as further described below. Further, the controller 123 may receive input from the non-contact temperature sensor 128. As also discussed in further detail below, the non-contact temperature sensor 128 may be configured to detect a temperature of the adhesive subject to the reticulation process. Accordingly, the controller 123 may alter the set-point and/or heat output of the heater 118 based on output of any one of or the combination of aforementioned sensors, as well as the temperature of the adhesive detected by the non-contact temperature sensor 128. Temperature control may therefore be fully automated in one aspect to adjust the temperature of the heater 118, and thus the temperature of the fluid output 103. The controller 123 may further be coupled to a computer and/or a data storage device for storing the data outputs and/or inputs for each of the abovementioned sensors and/or components. Further, the controller 123 may receive an input from a computer and/or network (several examples of which are shown and discussed further below with respect to FIGS. 15 and 16). The controller 123 may receive inputs and updated control signals based on data trending and/or machine learning relating to operation of the reticulation apparatus 100.

Figure 3:
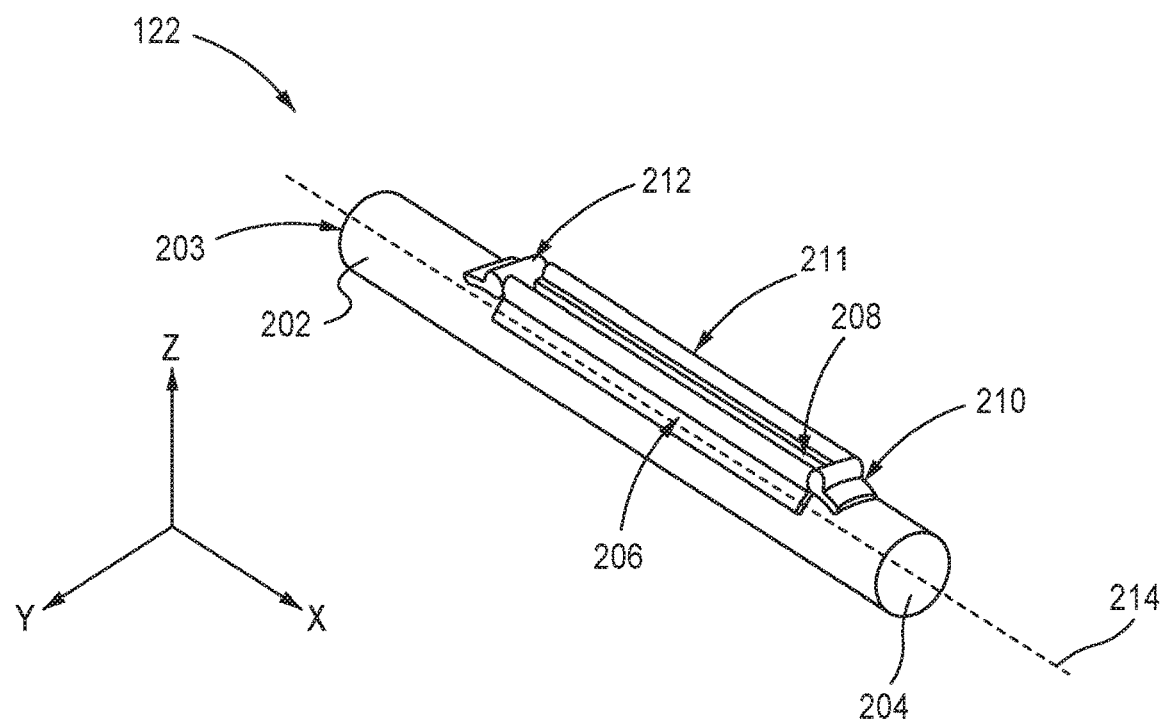
FIG. 3 is a see-through perspective view of an example reticulation apparatus in accordance with an aspect of the disclosure.
Figure 4:
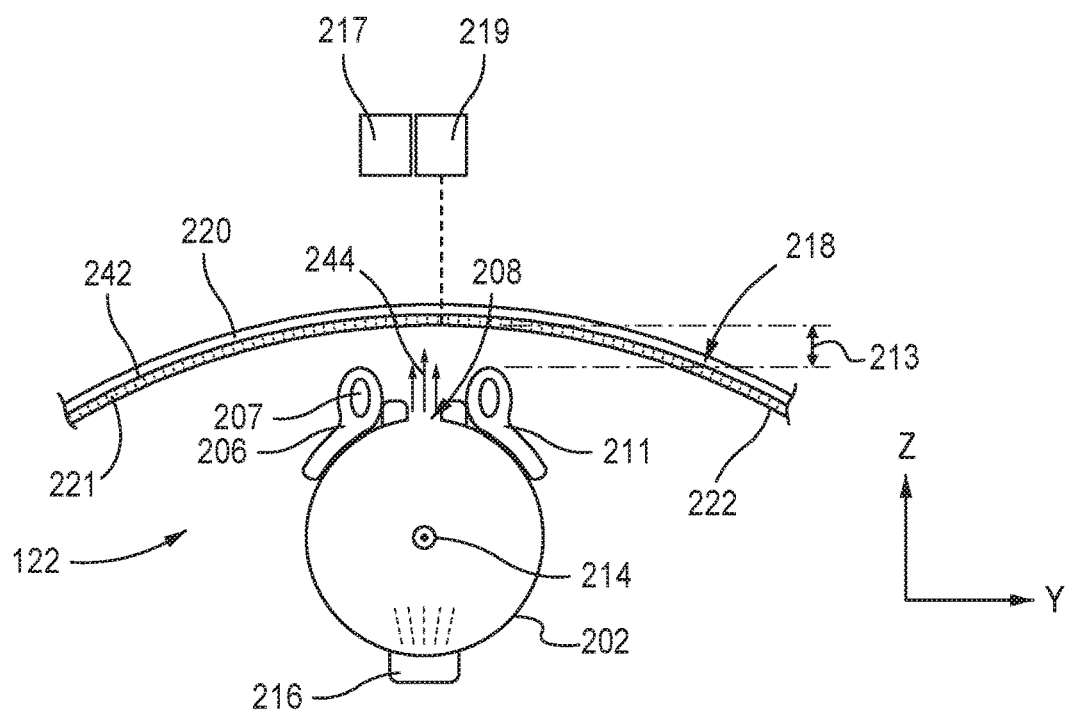
FIG. 4 is a cutaway view of the reticulation apparatus of FIG. 3 in a viewing direction perpendicular to the apparatus' axial length, in accordance with an aspect of the disclosure.
Figure 5:
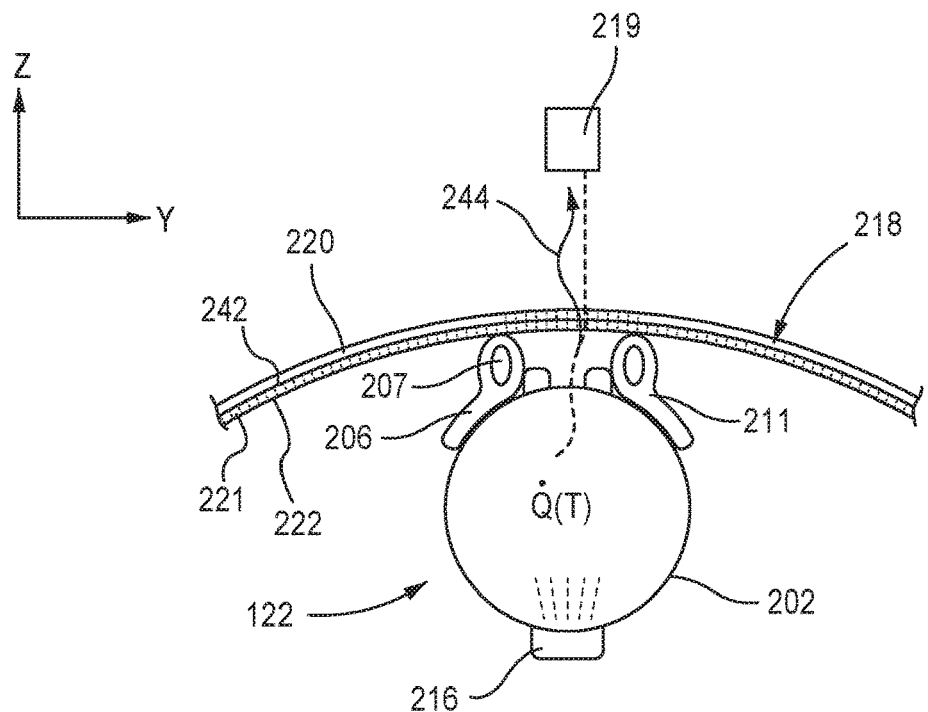
FIG. 5 shows another cutaway view of the reticulation apparatus of FIGS. 3 and 4, in accordance with an aspect of the disclosure.
Figure 6:
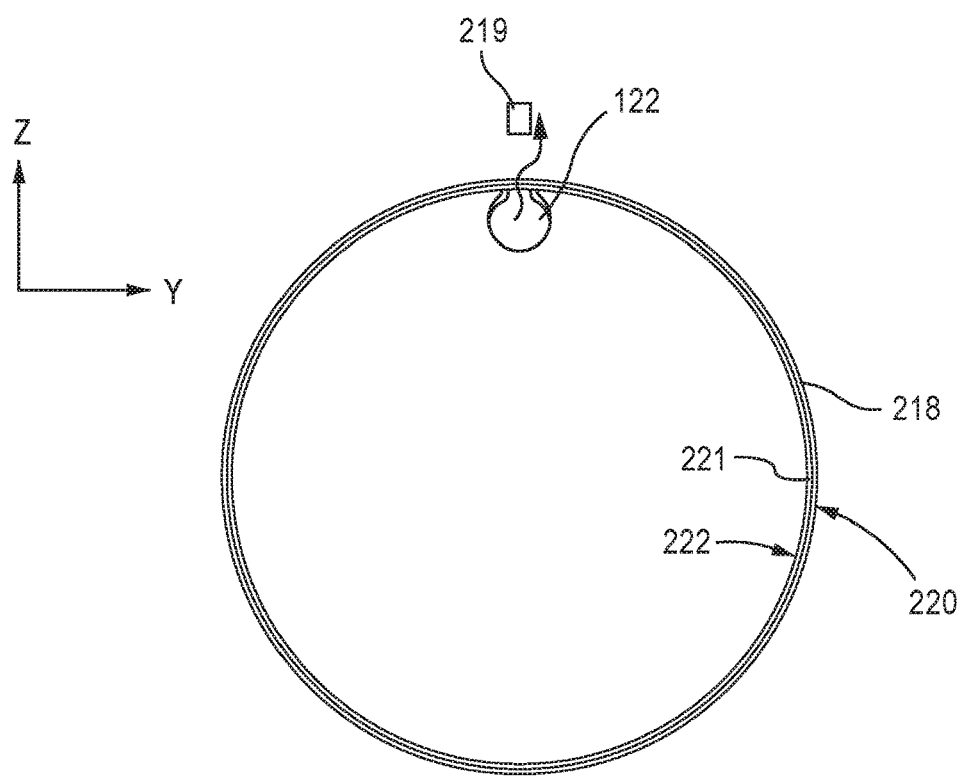
FIG. 6 shows yet another cutaway view of the reticulation apparatus of FIGS. 3-5, along with an example workpiece in accordance with an aspect of the disclosure.
Figure 7:
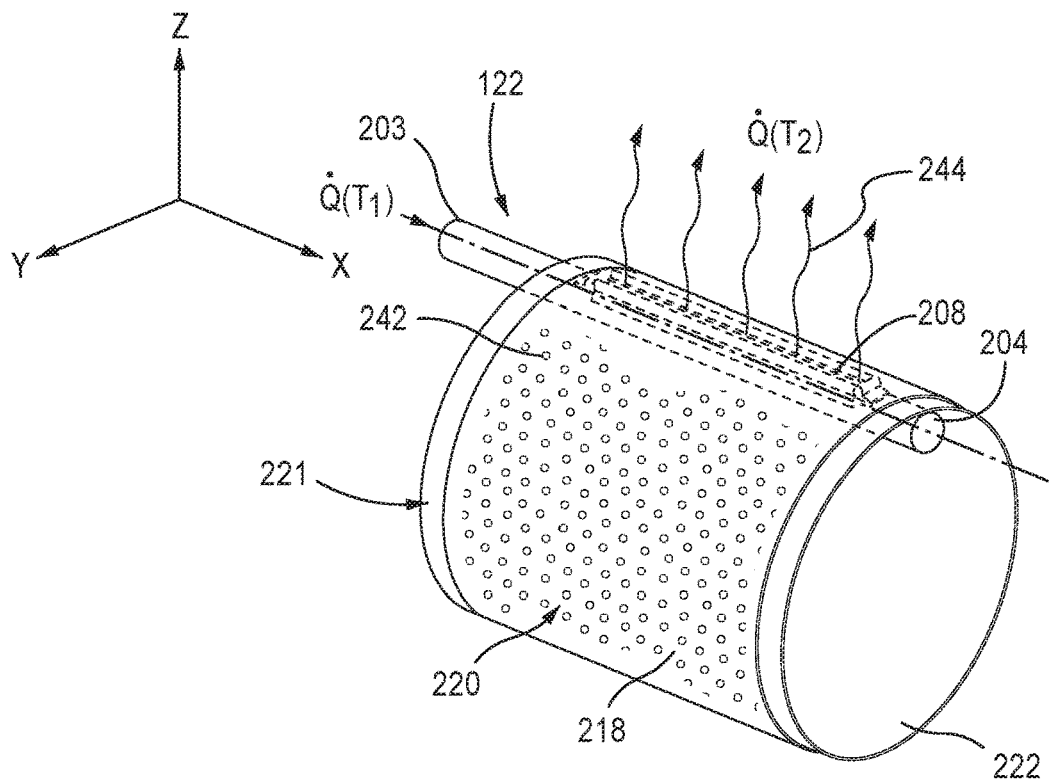
FIG. 7 is a perspective view of the reticulation apparatus and workpiece of FIG. 6, in accordance with an aspect of the disclosure.

FIG. 3 shows details of various features of a nozzle 122 in accordance with aspects of the present disclosure. FIGS. 4 and 5 shown cutaway views of the nozzle 122 of FIG. 3 operating with portions of a workpiece. FIGS. 6 and 7 show further views of a workpiece 221 that includes the portions shown in FIGS. 4 and 5, the workpiece 221 being usable in conjunction with aspects of the present disclosure. The workpiece 221 may have a perforations 242 having a first side 218 and a second side 222. The first side 218 of the workpiece 221 may have an adhesive 220 applied thereto, which may be in the form of a film adhesive. When the adhesive 220 is initially applied, the perforations 242 may be covered and at least partially blocked by the adhesive 220. During the reticulation process the nozzle opening 208 of nozzle 122 may be oriented so as to direct a fluid flow toward the second side 222 of the workpiece 221 so that the nozzle opening 208 is substantially aligned with a first group of perforations 242.

With reference to FIGS. 3-7, further details of the nozzle 122 of the reticulation apparatus 100 of FIG. 1 and use thereof will now be shown and described. As shown in FIGS. 3-7, the nozzle 122 may include an inlet 203, an body 202 and an end 204 opposite the inlet 203. The body 202 may extend along an axial direction (in the x-direction shown in FIG. 3) and about an axis 214. The nozzle 122 may include a nozzle opening 208 that may allow the escape of fluid received at the inlet 203. The nozzle 122 may further include side seals 206 and 211, a front seal 210, and a rear seal 212 that may, be used to selectively produce a seal about the nozzle opening 208 of the nozzle 122 relative to an item (e.g., a "workpiece") to which adhesive 220 has been applied. As an alternative to the seals 206, 210, 211, and 212 shown in FIG. 3, a single uninterrupted seal may form a rectangular or other appropriately shaped periphery, about nozzle opening 208.

While the example in FIGS. 3-6 shows a generally rectangular shaped nozzle opening 208 in the nozzle 122, it is noted that the nozzle opening 208 is not limited to such shape. The ends of the nozzle opening 208 corresponding to front and rear seals 210 and 212 may be curved. Accordingly, each seal may be of any suitable shape or form that follows the periphery of the nozzle opening 208 of the nozzle 122. Each of the seals 206, 210, 211, and 212 may include a hollow section 207 (see e.g., cutaway view of FIG. 4) to optimize the elastic qualities of each seal 206, 210, 211, or 212. The seals 206, 210, 211, and 212 may be formed of any suitable elastic and/or semi-elastic heat resistant material. In one aspect, each seal 206, 210, 211, or 212 may be formed of a material that does not react with the adhesive being used. The seal material may be or comprise an elastic material that does not include silicone. As another non-limiting example, the seal material may comprise fiberglass impregnated vulcanized rubber. As another example, the seal material may comprise a solid foam.

The nozzle opening 208 discussed above may be used, to direct a thin, planar stream of fluid toward a surface of the workpiece 221. In one aspect, the length of the nozzle opening 208 (e.g., in the x-direction in FIGS. 3 and 7) may be the same as or slightly shorter than the width of a the workpiece 221 (e.g., a length of a workpiece 221 in the x-direction as shown in FIG. 7). As shown in FIGS. 4 and 5, the nozzle 122 may further include a backlight 216. The backlight 216 may be configured to emit light from the nozzle opening 208 originating from within the nozzle 122. Accordingly, with the use of the backlight 216, based on the escape of light past the nozzle opening 208, the determination may be made whether or not the applied adhesive 220 has cleared a first group of passages (e.g., perforations 242 in the first side 218 of the workpiece 221, as shown in FIG. 7). A determination may be made that the adhesive 220 has sufficient cleared the first group of passages when the amount of light from the backlight 216 is sufficiently visible (or is detected above a threshold of light detection) from the first side 218 of the workpiece 221 through the first group of passages. In one example, a light detection sensor 217 may located so as to detect the light output through the perforation(s) 242, and a controller (see, e.g., controller 123 in FIG. 2) may determine whether the specific group of passages (e.g., perforations 242) are sufficiently cleared due to the amount of light detected by the light detection sensor 217.

As shown in FIG. 4, in operation, the nozzle 122 may initially be spaced from the workpiece 221. The reticulation apparatus 100 (FIG. 1) for providing fluid may provide a flow of heated fluid 244 through the nozzle opening 208 in the nozzle 122. In one example, the fluid may be air and may be provided via a compressor 104 (FIG. 1). In the example of FIG. 4, a heated fluid 244 may be provided through the nozzle opening 208 in the nozzle 122 while the nozzle 122 is spaced a distance 213 from the second side 222 of the workpiece 221. As further discussed below with reference to FIG. 13, the adhesive 220 may be heated until it falls within a specified range by the flow of heated fluid 244 from the nozzle 122. In the configuration shown in FIG. 4, the nozzle 122 may be spaced from the workpiece 221 so as to also allow the heated fluid 244 to escape through the gap of distance 213 between the workpiece 221 and the seals 206, 210, 211, and/or 212.

The flow of the heated fluid 244 against the second side 222 of the workpiece 221 may heat the adhesive 220 by conduction through the workpiece 221, as well as by convention and radiation through direct contact between the heated fluid 244 and the adhesive 220 through each of the perforations 242 in the workpiece 221. Maintaining a distance 213 between the seals 206, 210, 211, and/or 212 and the workpiece 221 may allow the temperature of the adhesive 220 to increase, while maintaining sufficiently low pressure in each perforation 242 so that the adhesive 220 does not pull away from the surface of the workpiece 221. The transfer of heat from the heated fluid 244 to the adhesive 220 in the aforementioned manner may thereby allow the adhesive 220 to be softened and to decrease in viscosity. As discussed further below with reference to FIG. 13, the heating of the adhesive 220 to within a specified temperature range may decrease the viscosity of the adhesive 220 and allow for reticulation of the adhesive 220 in a subsequent step of the process As further shown in FIG. 4, the temperature of the adhesive 220 may be read by a non-contact temperature sensor 219. The non-contact temperature sensor 219 may be positioned so as to face its detector toward the adhesive 220 located on the first side 218 of the workpiece 221. The non-contact temperature sensor 219 may be configured to monitor the temperature of the adhesive 220 while heated fluid 244 from nozzle 122 is provided to the second side 222 of the workpiece 221. In one aspect, the non-contact temperature sensor 219 may be configured to detect the temperature of the adhesive 220 on the first side 218 of the workpiece 221 and output a temperature signal. The output of the temperature signal from the non-contact temperature sensor 219 may be provided to a controller (see e.g., controller 123 in FIG. 2), and the controller may determine whether the adhesive 220 is heated so as to fall within a specified range (e.g., as discussed further with reference to FIG. 13). The abovementioned non-contact temperature sensor 219 may be or include any one or a combination of an optical pyrometer, line-measuring thermometer, infrared radiation thermometer, quantitative thermal imager, non-contact fiber optic thermometer.

Once it is determined that the temperature of the adhesive 220 falls within the appropriate specified range, the nozzle 122 may be moved from its initial position (e.g., a "first" position, as shown in FIG. 4) to the position shown in FIG. 5 (a "second" position). In the second position, the seals 206, 210, 211, and/or 212 surrounding the nozzle opening 208 of the nozzle 122 may be placed into contact with the second side 222 of the workpiece 221. Accordingly, a fluid pressure from the heated fluid 244 may result on the second side 222 and perforations 242 of the workpiece 221. The fluid pressure at each of the perforations 242 in combination with the softening of the adhesive 220 covering each of the perforations 242 may cause the adhesive 220 to be displaced away from (i.e., reticulated from) each of the perforations 242, resulting in unobstructed or only partially obstructed perforations 242, without the adhesive 220 being displaced from other portions of the first side 218 of the workpiece 221. Accordingly, the adhesive 220 may largely remain on the first side 218 of the workpiece 221 without clogging or blocking the perforations 242. Thus, after the aforementioned reticulation process, the perforations 242 may form openings in the adhesive 220 resulting from removal of selected portions of the adhesive material created in adhesive 220 on perforations 242 during the reticulation process.

The backlight 216 in the nozzle 122 may be used to verify that the abovementioned perforations 242 have been properly cleared using the reticulation process. When viewing the first side 218 of the workpiece 221 with the backlight illuminated, the amount of light passing through each perforation 242 may increase when the perforations 242 are properly cleared during the reticulation process. When an adhesive 220 is not fully reticulated and is blocking the perforations 242, the adhesive 220 may at least partially or fully block any light emitted from the backlight 216. When the perforations 242 are fully reticulated (i.e., adhesive 220 no longer fully blocks the perforations 242), the amount of light emitted from the backlight 216 through the perforations 242 may increase. Accordingly, it may be determined whether or not a perforation or plurality of perforations 242 are properly reticulated based on the amount of light passing through each perforation 242.

In one aspect, the aforementioned amount of light may be detected by a light detection sensor 217. The light detection sensor 217 may be a single or plurality of photodiode(s), phototransistor(s), photovoltaic cell(s), photojunction device(s), light dependent resistor(s). In one aspect, the light detection sensor 217 may be configured to detect the light emission from either a single one of and/or a plurality of perforations 242, received at the first side 218 of the workpiece 221 and reading indicative of the detected light emission. The output of the light detection device 217 may be provided to a controller (see, e.g., controller 123 in FIG. 2) and the controller may determine that the adhesive 220 is fully reticulated in the area corresponding to a group of perforations 242. Once the determination is made that the group of perforations 242 are fully reticulated, the nozzle 122 may be moved to reticulate another group of perforations 242 different from the aforementioned group of perforations 242.

Further, any of the abovementioned processes for detecting whether the properties of the adhesive 220 are within the specified temperature and viscosity may be conducted for the area containing the group of perforations 242 for which light detection has been applied. Once it is determined that the adhesive 220 is within the specified range, the nozzle 122 may be moved from the current position (e.g., as shown in FIG. 4) to another position (e.g., as shown in FIG. 5). By repeating the processes described above, the nozzle may be sequentially advanced, until the entire workpiece is reticulated.

Figure 8:
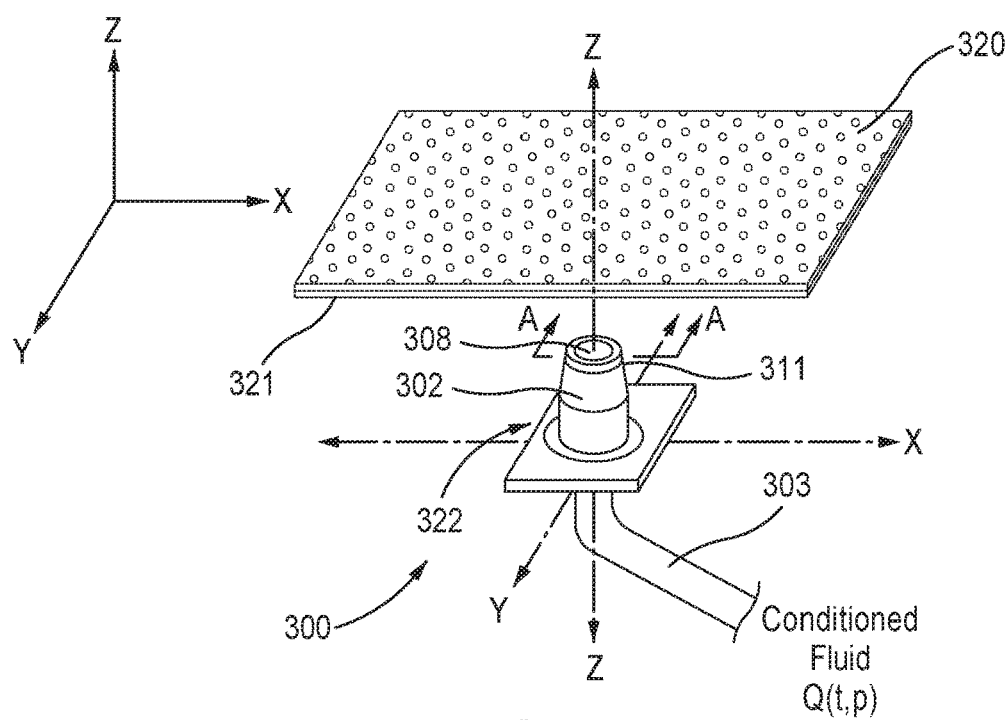
FIG. 8 is a perspective view of a reticulation apparatus in accordance with an aspect of the disclosure.
Figure 9:
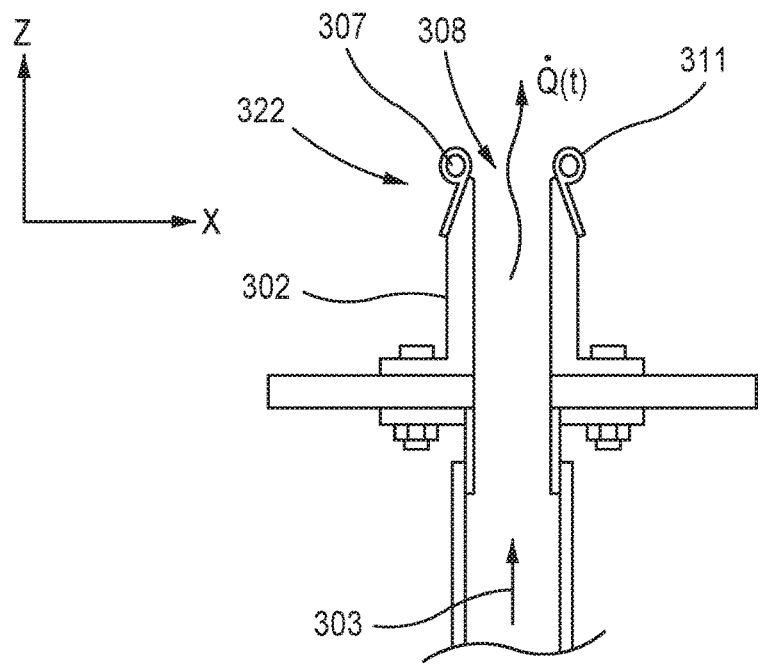
FIG. 9 is a cutaway view of the reticulation apparatus of FIG. 8, in accordance with an aspect of the disclosure.

FIGS. 8 and 9 show another implementation of various features of another reticulation apparatus 300 in accordance with aspects of the present disclosure. As shown in FIGS. 8 and 9, a nozzle 322 of the reticulation apparatus 300 may include an inlet 303 and a body 302. The body 302 may extend along a first direction (in the z-direction shown in FIG. 8) and have an axis extending along the first direction. The nozzle 322 may include a nozzle opening 308 that allows the escape of fluid received at the inlet 303. The nozzle 322 may further include a seal 311 extending about the edge of the nozzle opening 308. While the example in FIGS. 8 and 9 show a circular nozzle opening 308, it is noted that this shape of the nozzle opening 308 is not limited as such. The nozzle opening 308 may be oval shaped. Accordingly, the seal 311 may be any shape or form that follows the periphery of the nozzle opening 308 of the nozzle 322. The seal 311 may include a hollow section 307 to optimize the elastic qualities of the seal 311, similar to as shown in seal 206 of FIG. 4. The seal 311 may be formed of any elastic and/or semi-elastic heat resistant material. In one aspect, the seal 311 may be formed of a material that does not react with the adhesive being used (e.g., adhesive 220 described above). A material of the seal 311 may be an elastic material that does not include silicone. As another non-limiting example, the seal 311 may comprise fiberglass impregnated vulcanized rubber. As another example, the seal 311 may comprise a solid foam.

Figure 10:
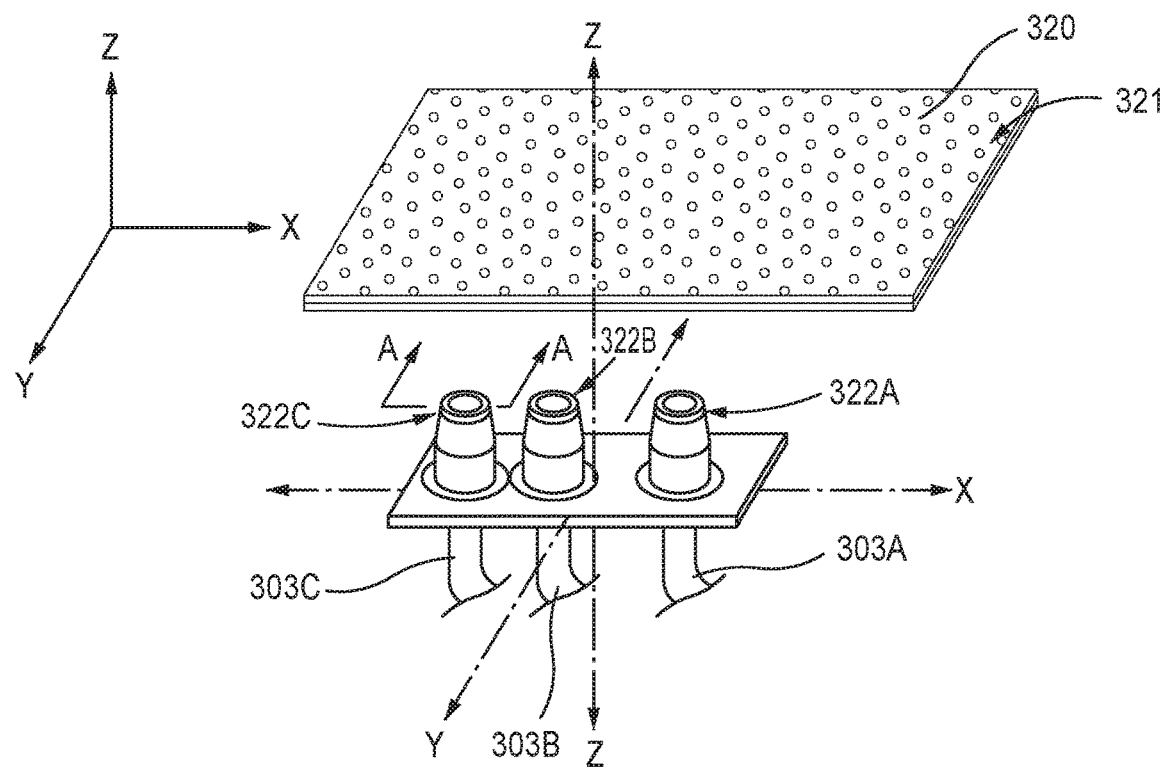
FIG. 10 shows a perspective view of an example reticulation apparatus in accordance with an aspect of the disclosure.

The nozzle 322 shown in FIGS. 8 and 9 may be used to reticulate an adhesive 320 on workpiece 321 using a process along the lines of the methods described above with regard to FIGS. 3-7. Further, the nozzle 322 in FIGS. 8 and 9 may be combined with any of the aspects discussed with respect to FIGS. 1-6 described above. As shown in FIG. 10, in another implementation in accordance with aspects of the present disclosure, multiple nozzles 322A-C may be arranged in a suitable space relationship relative to one another. Each of the nozzles 322A-C may include the aforementioned features discussed with relation to FIGS. 8 and 9. The nozzles 322A-C may receive heated fluid from multiple sources and/or a single source through inlets 303A-C, respectively.

Figure 11:
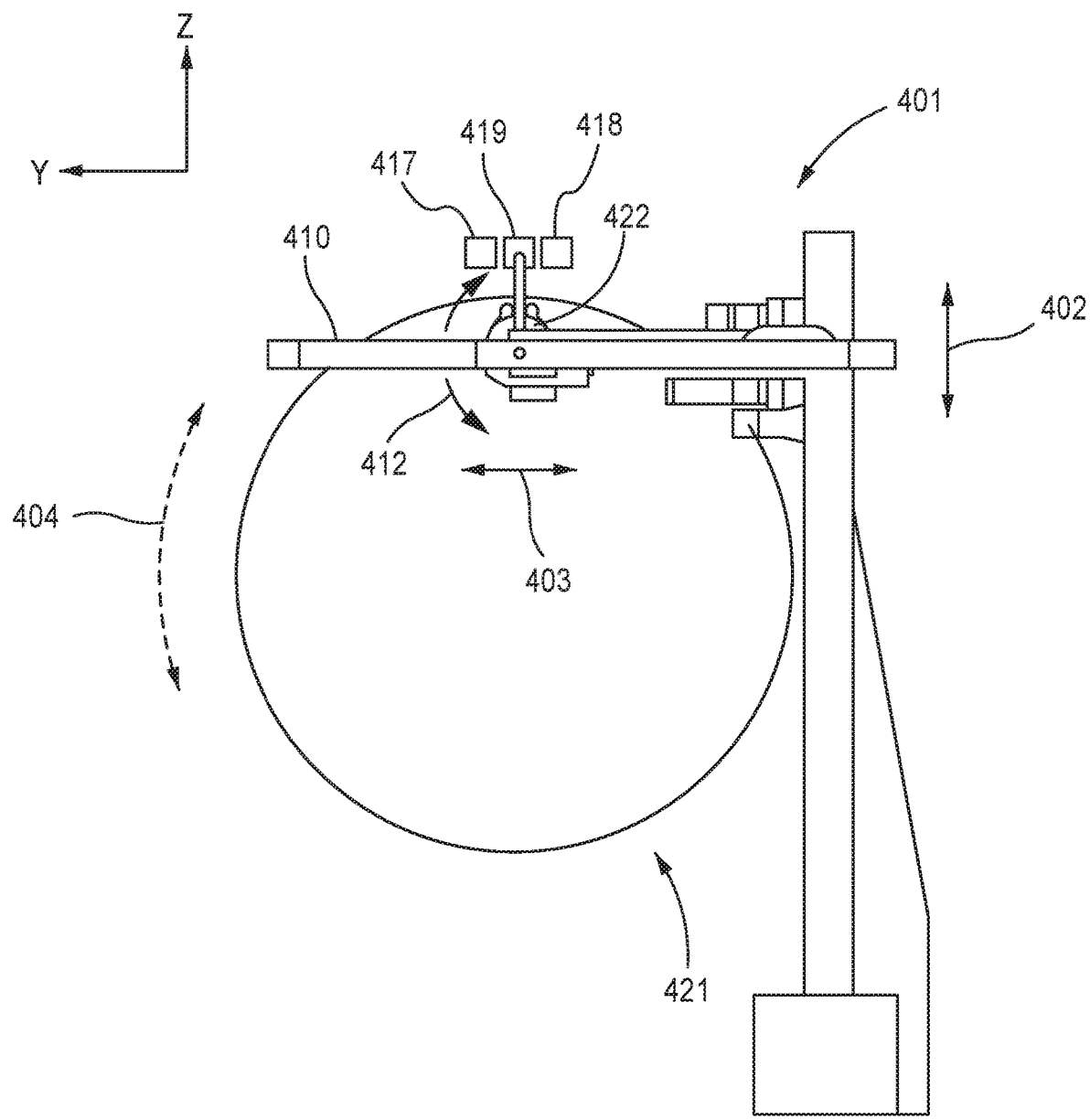
FIG. 11 shows a side view of an example reticulating apparatus in accordance with an aspect of the disclosure.

The abovementioned reticulation apparatus, systems, and processes, particularly, the positioning of each nozzle with relation to the workpiece, may be completed manually by an operator, or may be completed via use of automated or semi-automated features. In one implementation shown in FIG. 11, aspects of the abovementioned apparatus, systems, processes, and/or positioning steps (e.g., as shown and described in relation to FIGS. 3-7) may be automated by a single or plurality of computers and/or controllers executing pre-programmed sequences of control commands operating in conjunction with features to cause corresponding operation. Further, an active control logic may be used for position control. A positioning apparatus 401, which may also be interchangeably referred to herein as a computer numerical control (CNC) positioning apparatus, may be used to rotate and locate the position of a nozzle 422 in relation to a workpiece 421. The positioning apparatus 401 may be capable of selectively moving the position of the nozzle 422 along a z-axis direction 402, a y-axis direction 403 and/or an x-axis direction, which is perpendicular to this view relative to a the workpiece 421. Further the positioning apparatus 401 may be capable of selectively rotating the nozzle 422 in axial direction(s) 412, as shown in FIG. 11. The workpiece 421 may also be selectively rotatable about axial direction(s) 404 of the positioning apparatus 401 via the single or plurality of computers and/or controllers executing pre-programmed sequences of control commands (e.g., such computers and/or controllers may be housed within the positioning apparatus 401 or may be coupled to the positioning apparatus 401). The positioning apparatus 401 may further include one or more positioning sensors 418 for providing information to assist in the positioning of the workpiece 421, the nozzle 422, and/or other movements, as well as carrying out the reticulation process. The aforementioned sensor data may further be used for providing information to an active control logic that may actively determine and/or update the position of the nozzle 422 and/or the workpiece 421. The one or more sensors may include a non-contact temperature sensor 419 (e.g., reference 219 in FIG. 4) and/or a light detection sensor 417 (e.g., reference 217 in FIG. 4).

While a simplified and partially representative version of the positioning apparatus 401 is shown in FIG. 11, it is noted that any method of automating the movement of the nozzle 422, including, but not limited to axial motion about one or more axes may be employed. The nozzle 422 may be connected to a robotic arm 410. Further, it is noted that various features of any of the nozzles discussed above in relation to FIGS. 1-10 may be incorporated with nozzle 422.

Further, as mentioned above, the positioning apparatus 401 may include a first subsystem and a second subsystem. The first subsystem may be used to rotate and locate the position of a nozzle 422 in relation to a workpiece 421. The first subsystem may also be capable of selectively moving the position of the nozzle 422 along a z-axis direction 402, a y-axis direction 403 and/or an x-axis direction, which is perpendicular to this view, relative to the workpiece 421. Further the first subsystem of the positioning apparatus 401 may be capable of selectively rotating the nozzle 422 in axial direction(s) 412, as shown in FIG. 11. The second subsystem may a positioning apparatus separate and/or in communication with the first subsystem and may be capable of selectively rotating the workpiece about axial direction(s) 404 via the single or plurality of computers and/or controllers executing pre-programmed sequences of control commands. Further, the second subsystem may also be capable of selectively moving the position of the workpiece 421 along a z-axis direction 402, a y-axis direction 403, and/or an x-axis direction, which is perpendicular to this view, relative to nozzle 422. Further the second subsystem of the positioning apparatus 401 may be capable of selectively rotating the workpiece 421 with relation to nozzle 422.

Figure 12:
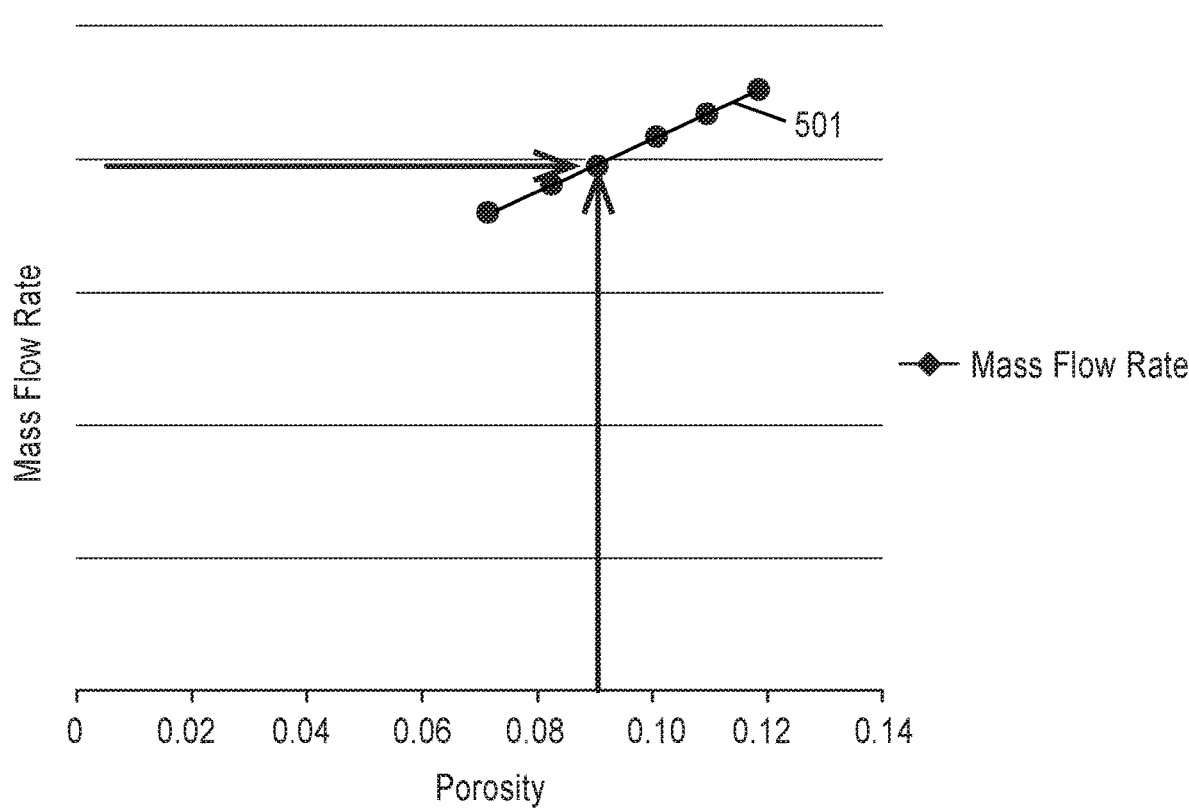
FIG. 12 is a chart showing mass flow rate with respect to porosity of an example workpiece in accordance with one aspect of the disclosure.
Figure 13:
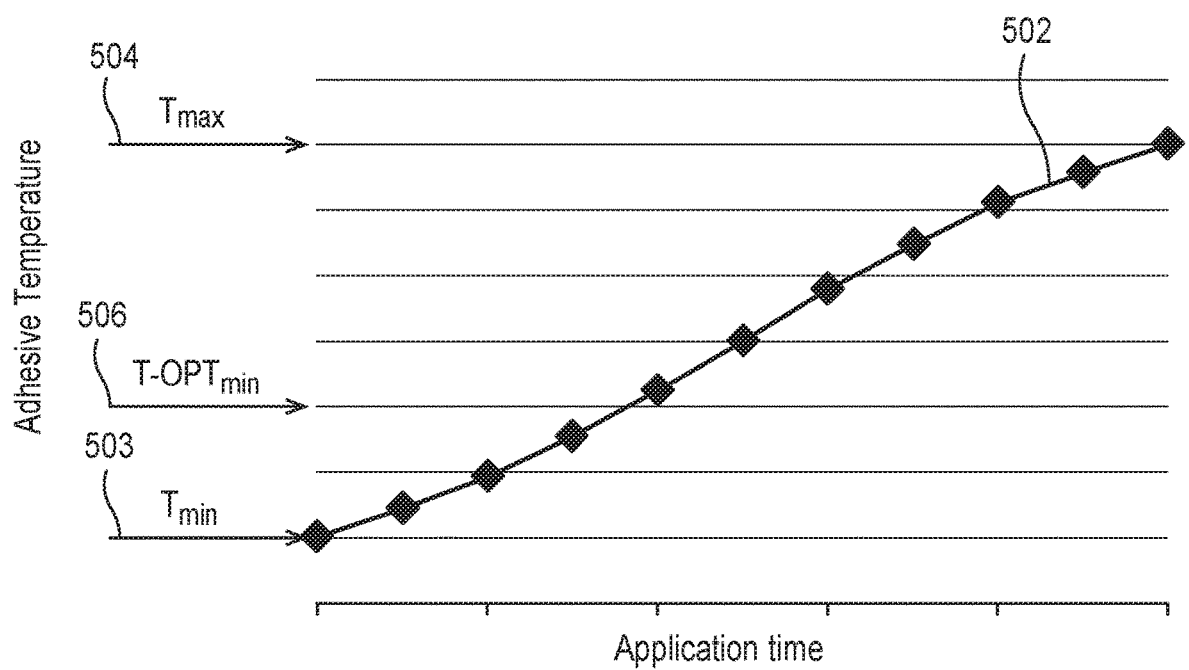
FIG. 13 is a chart showing temperature with respect to application time for an example apparatus in accordance with one aspect of the disclosure.
Figure 14:
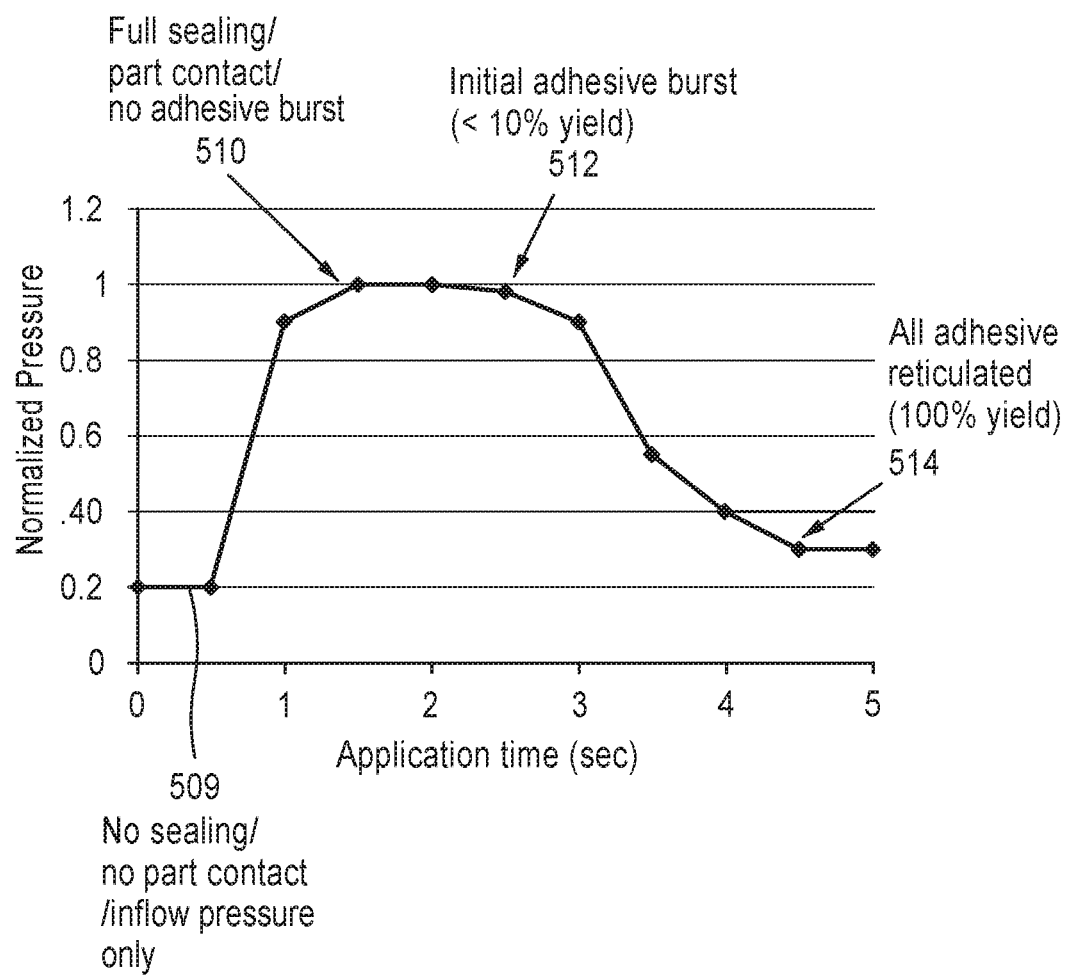
FIG. 14 is a chart showing normalized pressure with respect to application time for an example apparatus in accordance with one aspect of the disclosure.

FIGS. 12-14 show operating ranges which may be used for reticulating an adhesive in accordance with aspects of the present disclosure. In accordance with the chart shown in FIG. 12, a mass flow rate of a fluid (e.g., air) provided to the nozzle during a reticulation process may be selectively varied depending on the porosity of the workpiece being reticulated. In accordance with the chart shown in FIG. 12, a mass flow rate of the fluid may be increased as a function of the porosity or open area ratio being increased. The compressor and/or mass flow regulator therefore may be set based on the desired mass flow rate that corresponds with the porosity of the workpiece to be reticulated.

FIG. 13 contains a chart showing the variation temperature range (shown on the y axis of FIG. 13) of an adhesive as a function of the time that the nozzle is held in a single position. During a reticulation process, the adhesive may be heated by a heated fluid flow from a nozzle. Heating of the adhesive may function to decrease the viscosity of the adhesive so that each of the perforations in the workpiece may be cleared by the flow of the heated fluid. In one application, the adhesive may have a curing temperature range, and during reticulation process, it may be desired to decrease the viscosity of the adhesive by heating the adhesive above a minimum temperature (e.g., $T_{min}$ 503 as shown in FIG. 13), which may allow for proper reticulation, but also maintain the temperature below a curing temperature (e.g., $T_{max}$ 504 as shown in FIG. 13) of the adhesive. By performing the reticulation process within the abovementioned range, further components (e.g., a honeycomb panel)

may be added to the workpiece during the curing process in order to form a substrate, and the adhesive may be fully cured at a later time once all the components are fully assembled. Accordingly, as shown in FIG. 13, the application time of the fluid to a group of perforations on the workpiece may be optimized so that the adhesive remains at the ideal temperature for reticulation (e.g., optimization may occur at T-OPT$_{min}$ 506 as shown in FIG. 13). The above-mentioned processes of following the temperature range and application time may be used as the nozzle is advanced among groups of perforations, and/or the heat output of the heater may be varied when the temperature of the adhesive is determined to be within the desired range.

FIG. 14 presents a chart of normalized pressure varying as a function of application time, which may be utilized, during a reticulation process. During a first portion of the reticulation process, the nozzle may be positioned such that its seals do not fully contact the surface of a workpiece being processed. While the nozzle is in such spaced configuration relative to the workpiece, the normalized pressure may fall within a first range area 509, as shown in the chart of FIG. 14. Once the temperature of the adhesive falls within a desired range, the nozzle may be moved to second position where the seals contact a surface of the workpiece. Once the seals are placed in contact with the workpiece the normalized pressure may increase (e.g., to the area in the graph of a second point 510 in the chart of FIG. 14). The increase in the normalized pressure may then cause the adhesive that previously covered the perforations to move away from and/or unseal each of the perforations. Once the perforations begin to become uncovered, the normalized pressure may begin to drop (e.g., see area in the graph of point 512 in FIG. 14), and such uncovering may continue to occur until most or all of the perforations are fully uncovered, and the workpiece is sufficiently reticulated, at which time a "normalized" pressure may be reached (see, e.g., area of graph near point 514 in FIG. 14). As discussed above, a pressure sensor may therefore be used to determine whether the perforations are sufficiently reticulated; optionally, such pressure sensor may also be used with corresponding light detection to determine or confirm sufficient reticulation. After the determination is made that the perforations are sufficiently reticulated, the nozzle and/or workpiece may be moved so that the process may be repeated to reticulate another section of perforations.

Figure 15:
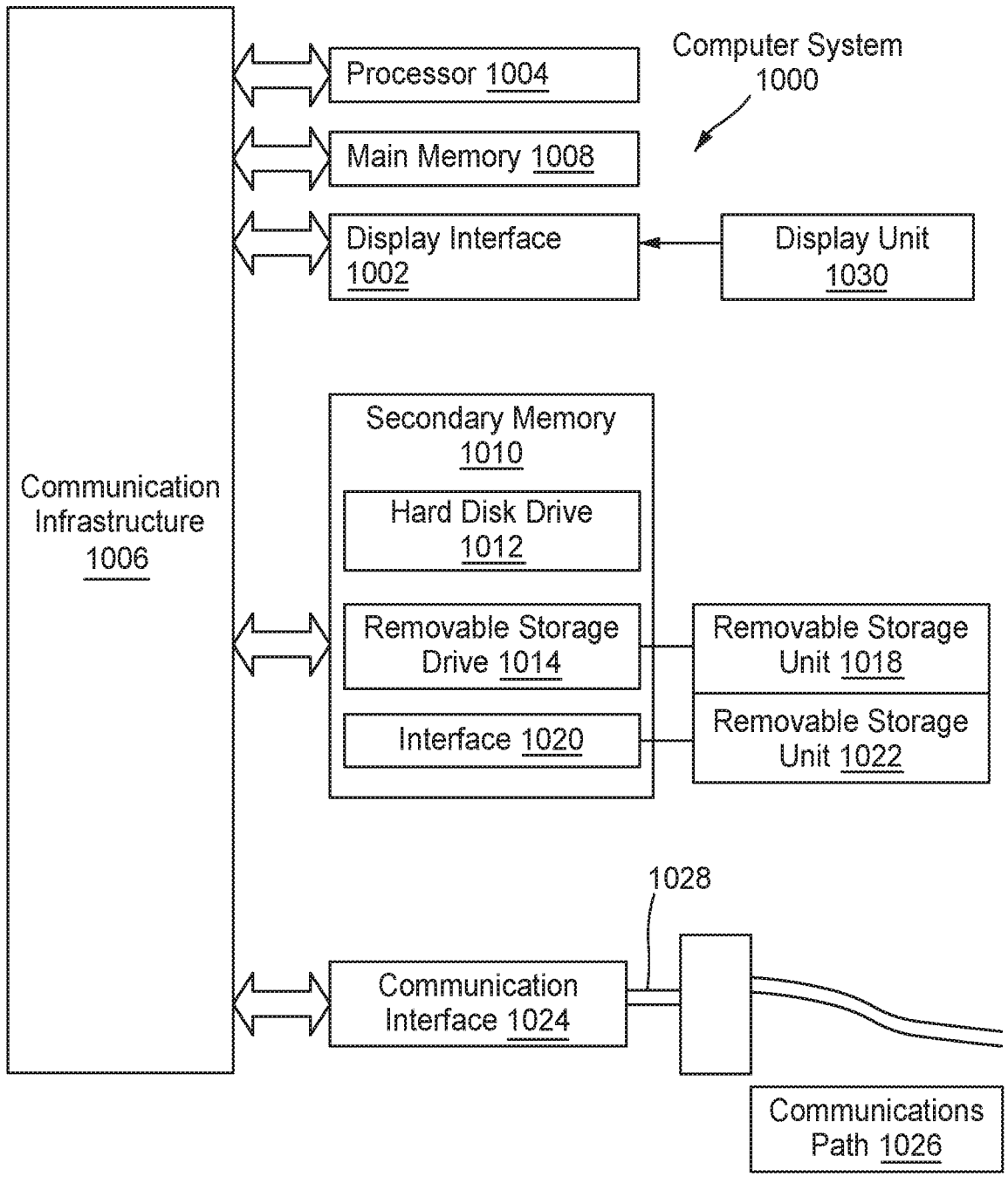
FIG. 15 illustrates an example computer system for an electronic system usable with various features in accordance with an aspect of the disclosure.

As discussed above, the processes mentioned throughout the disclosure may be completed using fully or partially automated features. The automated process may be carried out using hardware, software, or a combination thereof and may be implemented in one or more computer systems or other processing systems. In an aspect of the present invention, features are directed toward one or more computer systems capable of carrying out the functionality of the data processing disclosed above. An example of such a computer system 1000 is shown in FIG. 15.

Computer system 1000 includes one or more processors, such as processor 1004. The processor 1004 is connected to a communication infrastructure 1006 (e.g., a communications bus, cross-over bar, or network). Various software aspects are described in terms of this computer system 1000. After reading this description, it will become apparent to a person skilled in the relevant art(s) how to implement aspects of the invention using other computer systems and/or architectures.

Computer system 1000 may include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, hard disk drive 1012, and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., that is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, A removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, that allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This communications path 1026 carries the signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1018, a hard disk installed in hard disk drive 1012, and signals 1028. These computer program products provide software to the computer system 1000. Aspects of the present invention are directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

In an aspect of the present invention where the invention is implemented using software, the software may be stored in a computer program product and loaded into computer system 1000 using removable storage drive 1014, hard drive 1012, or interface 1020. The control logic (software), when executed by the processor 1004, causes the processor 1004 to perform the functions described herein. In another aspect of the present invention, the computer system 1000 is implemented primarily in hardware using, hardware components, such as application specific integrated circuits (ASICs).

Figure 16:
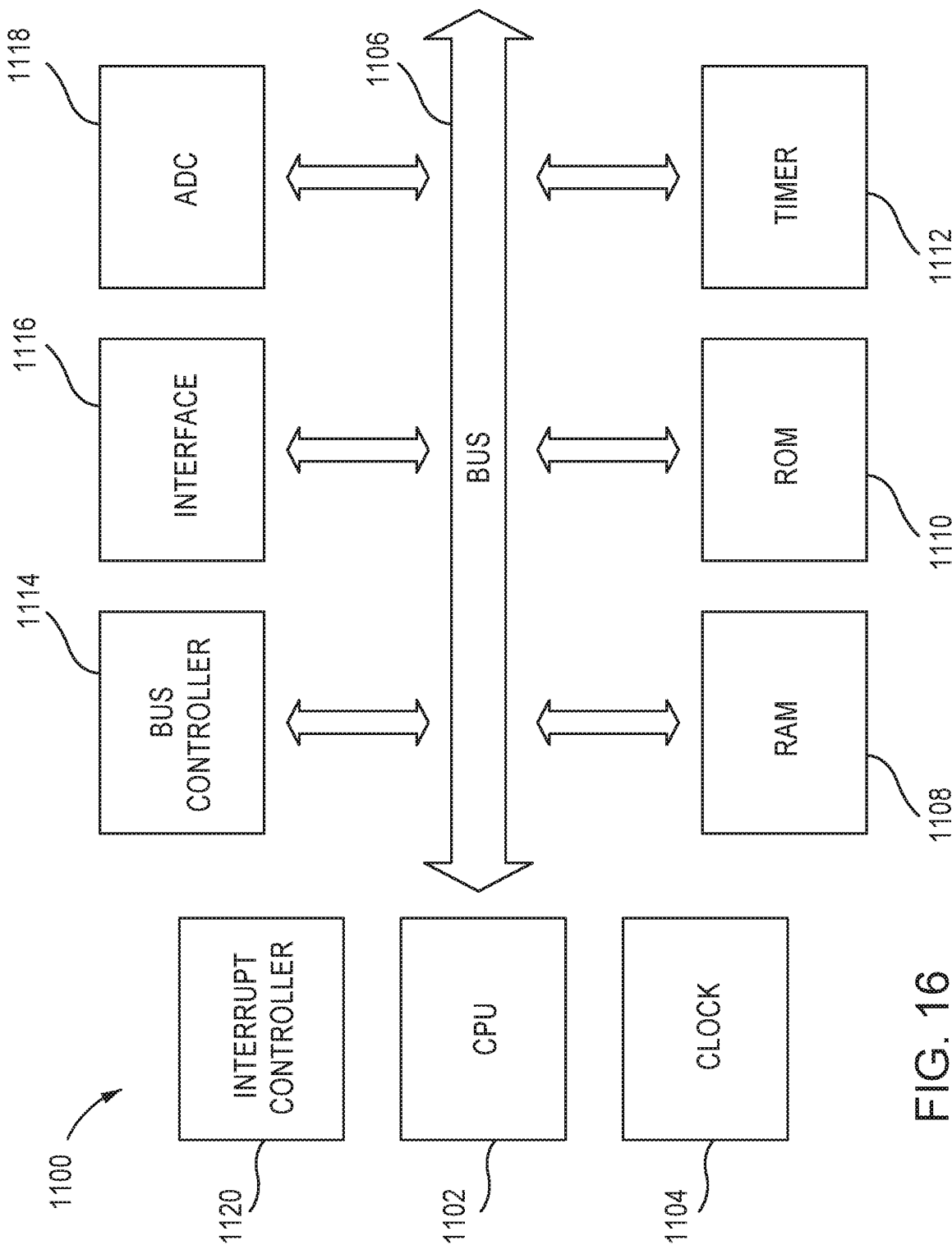
FIG. 16 shows an example representative diagram of various components of an example controller for use in accordance with an aspect of the disclosure.

In some implementations, as part of or incorporating various features described herein, one or more controllers may be implemented (e.g., within positioning apparatus 401 of FIG. 11) for carrying out various operations in accordance with aspects of the present invention. Various components of such a controller 1100 are shown in representative block diagram form in FIG. 16. In FIG. 16, the controller 1100 includes a CPU 1102, clock 1104, RAM 1108, ROM 1110, a timer 1112, a BUS controller 1114, an interface 1116, and an analog-to-digital converter (ADC) 1118 interconnected via a BUS 1106.

The CPU 1102 may be implemented as one or more single core or multi-core processors, and receive signals from an interrupt controller 1120 and a clock 1104. The clock 1104 may set the operating frequency of the entire controller 1100 and may include one or more crystal oscillators having predetermined frequencies. Alternatively, the clock 1104 may receive an external clock signal. The interrupt controller 1120 may also send interrupt signals to the CPU, to suspend CPU operations. The interrupt controller 1120 may transmit an interrupt signal to the CPU when an event requires immediate CPU attention.

The RAM 1108 may include one or more Static Random Access Memory (SRAM), Dynamic Random Access Memory (DRAM), Synchronous Dynamic Random Access Memory (SDRAM), Double Data-Rate Random Access Memory (DDR SDRAM), or other suitable volatile memory. The Read-only Memory (ROM) 1110 may include one or more Programmable Read-only Memory (PROM), Erasable Programmable Read-only Memory (EPROM), Electronically Erasable Programmable Read-only memory (EEPROM), flash memory, or other types of non-volatile memory.

The timer 1112 may keep time and/or calculate the amount of time between events occurring within the controller 1100, count the number of events, and/or generate baud rate for communication transfer. The BUS controller 1114 may prioritize BUS usage within the controller 1100. The ADC 1118 may allow the controller 1100 to send out pulses to signal other devices.

The interface 1116 may comprise an input/output device that allows the controller 1100 to exchange information with other devices. In some implementations, the interface 1116 may include one or more of a parallel port, a serial port, or other computer interfaces.

Figure 17:
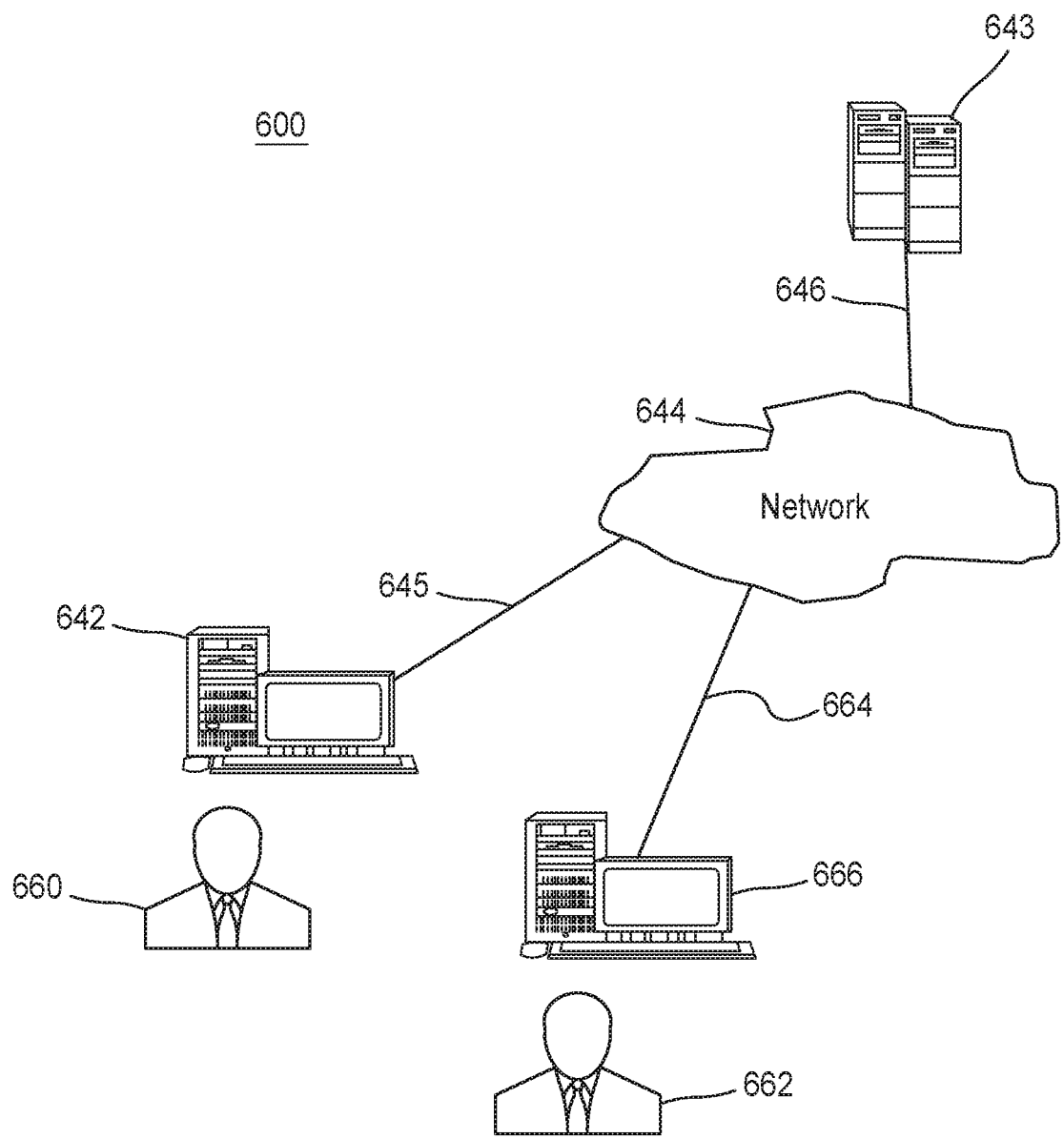
FIG. 17 is a block diagram of various example system components usable in accordance with an aspect of the disclosure.

FIG. 17 is a representative diagram of various system components for use on a network, in accordance with aspects of the present disclosure. The network system 600 of FIG. 17 includes one or more accessors 660, 662 (also referred to interchangeably herein as one or more "users") and one or more terminals 642, 666. Terminals 642, 666 may provide data processing application or input selection for control of a reticulation apparatus along the lines of FIGS. 1-11. In one aspect, data for use in accordance with aspects described herein may, be input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, a network 644, such as the Internet or an intranet, and couplings 645, 646, 664. The couplings 645, 646, 664 include, wired, wireless, or fiberoptic links. The server 643, may comprise or be coupled, in turn, to a controller for a reticulation apparatus along the lines of FIGS. 1-11.

The aspects discussed herein can also be described and implemented in the context of computer-readable storage medium storing computer-executable instructions. Computer-readable storage media includes computer storage media and communication media such as flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. A reticulation apparatus for reticulating an adhesive on a first side of a perforated workpiece, the workpiece further having a second side opposite the first side, the apparatus comprising:
   a nozzle, wherein the nozzle includes:
      a body;
      a nozzle opening in fluid communication with the body;
      a seal for at least partially sealing the nozzle opening relative to a portion of the workpiece;
   a positioning apparatus for varying the relative position of the nozzle and the workpiece;
   a fluid source for providing a heated and pressurized fluid to the second side of the workpiece, wherein the fluid source is in fluid communication with the nozzle and is configured to provide a fluid at a first normalized pressure to the workpiece; and
   a sensing device comprising at least one of a temperature sensor for detecting a temperature of adhesive on the first side of the workpiece, a light detection sensor for detecting an amount of light from the second side of the workpiece, or a pressure sensor for detecting a pressure at a location on the second side of the workpiece, wherein the reticulation apparatus is configured to determine, based on an output of the sensing device, that the temperature of the adhesive at the first side of the workpiece falls within a specified adhesive softening range, and to then provide a second normalized pressure to the first side of the workpiece that is greater than a first normalized pressure.

2. The reticulation apparatus of claim 1, wherein the positioning apparatus moves the workpiece from a first position for providing the fluid to a first group of passages in the workpiece to a second position for providing the fluid to a second group of passages in the workpiece.

3. The reticulation apparatus of claim 2, wherein the positioning apparatus further comprises:
a first positioning subsystem for rotating the workpiece; and
a second positioning subsystem for moving the nozzle in a pre-determined path.

4. The reticulation apparatus of claim 3, wherein the first positioning subsystem is configured to rotate the workpiece about a first axis and wherein the second positioning subsystem moves the first nozzle along a linear path toward or away from the workpiece.

5. The reticulation apparatus of claim 4, wherein the pressure of the fluid is increased from the first normalized pressure to the second normalized pressure by moving the nozzle along the linear path towards the workpiece from a position where the seal is spaced from the second side of the workpiece to a position where the seal is at least partially engaged with the second side of the workpiece.

6. The reticulation apparatus of claim 1, wherein the positioning apparatus moves the nozzle from a first position where the seal is spaced from the second side of the workpiece to a second position where the seal is at least partially engaged with the second side of the workpiece.

7. The reticulation apparatus of claim 6, wherein the positioning apparatus moves the nozzle from the first position to the second position in response to the temperature sensor detecting a temperature within, or at exceedance of, a preselected range.

8. The reticulation apparatus of claim 1 wherein the fluid source comprises:
a compressor;
a fluid storage device for storing compressed fluid;
a heater interoperable with the compressor or the fluid storage device;
a fluid flow device configured to determine the rate of flow of the fluid; and
a fluid temperature sensor for detecting the temperature of the fluid.

9. The reticulation apparatus of claim 8 wherein the fluid temperature sensor comprises a thermocouple located within the flow of fluid.

10. The reticulation apparatus of claim 8, further comprising an in-line fluid flow device comprising a mass flow meter and a mass flow regulator.

11. The reticulation apparatus of claim 8, further comprising an in-line mass flow meter.

12. The reticulation apparatus of claim 1 wherein the nozzle body includes a chamber, and wherein the chamber is elongated along an axial direction, wherein the nozzle opening has a length parallel with the axial direction of the chamber and has a width in a direction perpendicular to the axial direction of the chamber, and wherein the length of the nozzle opening is at least two times the width of the nozzle opening.

13. The reticulation apparatus of claim 1 further comprising:
a light emitting apparatus within the nozzle body configured to emit light from the nozzle opening of the nozzle, wherein the light wavelength and/or intensity characteristics allow for detection of the light by a human eye or the light detection sensor.

14. The reticulation apparatus of claim 13, wherein the positioning device moves the relative position of the workpiece from a first location relative to a first group of passages in the workpiece to a second location relative a second group of passages in the workpiece in response to the light detection sensor detecting light above a detection threshold.

15. The reticulation apparatus of claim 1, wherein the positioning apparatus moves the workpiece from a first location for providing the heated fluid to a first group of passages in the workpiece to a second location for providing the heated fluid to a second group of passages in the workpiece in response to one selected from a pressure detected by the pressure sensor falling within a predetermined range and light detected by the light detection sensor falling within a predetermine range.

16. The reticulation apparatus of claim 1, wherein the sensing device comprises the temperature sensor, wherein based on an output of the temperature sensor indicating that the temperature of the adhesive at the first side of the workpiece falls within a specified adhesive softening range, the fluid source provides the second normalized pressure.

17. A reticulation apparatus for reticulating an adhesive on a first side of a perforated workpiece, the workpiece further having a second side opposite the first side, the apparatus comprising:
a nozzle, wherein the nozzle includes:
a body;
a nozzle opening in fluid communication with the body;
a seal for at least partially sealing the nozzle opening relative to a portion of the workpiece;
a positioning apparatus for varying the relative position of the nozzle and the workpiece;
a fluid source for providing a heated and pressurized fluid to the second side of the workpiece, wherein the fluid source is in fluid communication with the nozzle and is configured to provide a fluid at a first normalized pressure to the workpiece; and
at least one sensing reticulation apparatus, wherein the device is configured to determine, based on an output of the sensing device, that a temperature of the adhesive at the first side of the workpiece falls within a specified adhesive softening range, and to then provide a second normalized pressure to the first side of the workpiece that is greater than a first normalized pressure, wherein the pressure of the fluid is increased from the first normalized pressure to the second normalized pressure by moving the nozzle along towards the workpiece from a position where the seal is spaced from the second side of the workpiece to a position where the seal is at least partially engaged with the second side of the workpiece.

18. The reticulation apparatus of claim 17, wherein the sensing device is a temperature sensor for detecting a temperature of the adhesive on the first side of the workpiece.

19. The reticulation apparatus of claim 17, wherein the positioning apparatus further comprises:
a first positioning subsystem for rotating the workpiece about a first axis; and
a second positioning subsystem for moving the nozzle along a linear path towards the workpiece from the position where the seal is spaced from the second side of the workpiece to the position where the seal is at least partially engaged with the second side of the workpiece.

20. The reticulation apparatus of claim 19 further comprising a light emitting apparatus within the nozzle body configured to emit light from the nozzle opening of the nozzle and a light detection sensor for detecting an amount of light passing through the workpiece, wherein the first positioning subsystem moves the workpiece from a first location for providing the heated fluid to a first group of passages in the workpiece to a second location for providing the heated fluid to a second group of passages in the workpiece in response to the light detected by the light detection sensor falling within a predetermine range.

21. The reticulation apparatus of claim 20, further comprising a pressure sensor for detecting a pressure at a location on the second side of the workpiece, wherein the first positioning subsystem moves the workpiece from a first location for providing the heated fluid to a first group of passages in the workpiece to a second location for providing the heated fluid to a second group of passages in the workpiece in response to a pressure detected by the pressure sensor falling within a predetermined range.

* * * * *